US008001139B2

(12) United States Patent
Slaney et al.

(10) Patent No.: US 8,001,139 B2
(45) Date of Patent: Aug. 16, 2011

(54) USING A BIPARTITE GRAPH TO MODEL AND DERIVE IMAGE AND TEXT ASSOCIATIONS

(75) Inventors: Malcom Slaney, Sunnyvale, CA (US); Srinivasan H. Sengamedu, Bangalore (IN)

(73) Assignee: Yahoo! Inc., Sunnyvale, CA (US)

( * ) Notice: Subject to any disclaimer, the term of this patent is extended or adjusted under 35 U.S.C. 154(b) by 907 days.

(21) Appl. No.: 11/961,893

(22) Filed: Dec. 20, 2007

(65) Prior Publication Data

US 2009/0160860 A1 Jun. 25, 2009

(51) Int. Cl.
*G06F 7/00* (2006.01)
*G06F 17/30* (2006.01)

(52) U.S. Cl. ....................................................... 707/765
(58) Field of Classification Search .................... 707/765
See application file for complete search history.

(56) References Cited

U.S. PATENT DOCUMENTS

| 5,983,237 A | 11/1999 | Jain et al. |
| 6,144,958 A | 11/2000 | Ortega et al. |
| 2003/0212666 A1 | 11/2003 | Basu et al. |
| 2007/0192350 A1* | 8/2007 | Gao et al. ...................... 707/102 |
| 2008/0250011 A1 | 10/2008 | Haubold et al. |

OTHER PUBLICATIONS

"Notification of Transmittal of the International Search Report and the Written Opinion of the International Searching Authority, or the Declaration" International application No. PCT/US2008/087150 dated Mar. 31, 2009 (4 pages).
U.S. Appl. No. 11/966,704, filed Dec. 28, 2007, Notice of Publication, Jun. 25, 2009.

* cited by examiner

*Primary Examiner* — John R. Cottingham
*Assistant Examiner* — Nicholas E Allen
(74) *Attorney, Agent, or Firm* — Hickman Palermo Truong & Becker LLP

(57) ABSTRACT

A method for deriving probabilistic association scores based on image content is provided. A bipartite graph is constructed based on a database of image content and associated textual content. One partition of the bipartite graph contains image content and the other partition of the bipartite graph contains textual content. Weighted edges between nodes in the two partitions represent associations between the image content and textual content in the database. Random walks on the bipartite graph are performed to derive probabilistic association scores between image content and textual content. Association scores are used to automatically annotate images and detect spurious image tags.

26 Claims, 4 Drawing Sheets

USING A BIPARTITE GRAPH TO MODEL AND DERIVE IMAGE AND TEXT ASSOCIATIONS

FIELD OF THE INVENTION

The present invention relates to the field of searching and query expansion.

BACKGROUND

Large databases containing image-rich web pages and associated text are now common. Typically, images are associated with the text surrounding the images on web pages or the text in tags that users have associated with the images. Models can be built based on databases containing information about images and text to model the associations between the images and text to perform searches on the images.

For example, a database contains information that image I is associated with text string T. A model is built from the database that contains this information. When a user queries for images with a query string T, the model determines that image I is associated with text string T and provides image I as the query result to the user. If there are other images that are associated with text string T, these associated images may also be provided to the user as query results.

The modeling of associations between images and the associated text, also known as keywords, contains two components. The first component is image representation, where the images are represented as a collection of "visual words". A visual word is a description of a feature or characteristic of a particular image. For example, an image of a living room that contains a lamp and a coffee table can be represented as a collection of visual words. For example, the set of visual words that represent the living room may include two subsets: a subset of visual words that corresponds to a lamp and another subset of visual words that correspond to a coffee table.

There are multiple ways of representing an image as a collection of visual words. One way is to represent the image as "blobs", where each "blob" is described by feature color and texture vectors. Representing images as "blobs" is described in detail in K. Barnard, et al., "Matching Words and Pictures," Journal of Machine Learning Research, 2003. Another way of representing an image as a collection of visual words is to represent the image as a collection of "salient points", as described by A. Bosch, et al., "Scene Classification via pLSA", European Conference on Computer Vision, 2006. Salient points can be detected using several techniques, some of which are described in C. Schmidt et al., "Evaluation of Interest Point Detectors," International Journal of Computer Vision, 2000. Once detected, a salient point can be represented as a SIFT (Scale Invariant Feature Transform) vector. This representation of salient points using SIFT is described in further detail in D. G. Lowe, "Distinctive image features from scale-invariant keypoints".

The second component of modeling image and keyword associations is the building of a statistical model. Statistical models employing the use of hidden, or latent, variables have been used to model the statistical relationships between the collection of visual words that represent images, and a collection of keywords which are associated with the images. Several statistical model using latent variables have been developed, including: PLSA (Probabilistic Latent Semantic Indexing), as described in T. Hoffman, "Probabilistic Latent Semantic Analysis," Proceedings of Uncertainty in Artificial Intelligence, UAI'99, 1999, Latent Dirichlet Allocation, as described in D. Blei, et al., "Latent Dirichlet Allocation", NIPS, 2002, and Correspondence LDA as described in D. Blei and M. Jordan, "Modeling Annotated Data," ACM SIGIR Conference, 2003.

However, statistical models that employ the use of latent variables are limiting because these models use a bottleneck approach—image representations are further broken down by these models into a small number of latent variables, and statistical associations are made between keywords and latent variables. These models also suffer from the drawback that estimation of latent variables is often very complex.

Furthermore, current statistical models primarily provide unidirectional associations from images to keywords or from keywords to images, limiting the derivation of implicit associations among images and words.

Therefore, there is a need for a way to jointly model image-keyword associations inclusively to allow free and unlimited associations between images and keywords. Furthermore, the model should provide bidirectional associations between images and text.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Learning and Visual Words

The process of collecting and extracting information from large data sets is generally referred to herein as "learning". According to one approach, learning is performed on a database of images and their associated keywords. First, the images on the database are processed into representations of the content in the images. As discussed above, there are many ways of representing image content. According to one approach, salient point detection is performed on each image in the database, and the salient points are represented by SIFT descriptors. Next, each set of SIFT descriptors is represented by a codeword from a codebook. The result is that each image in the database is represented by a collection of codewords. The techniques described herein, however, are not limited to salient point detection for representing image content; other methods of representing image content, such as using "blobs", may also be used.

The database also contains information about what keywords are associated with each image. An image may be associated with more than one keyword. Therefore, once the images have been processed into codewords, each image is associated with a set of "visual words" (e.g., codewords) and a set of "linguistic words" (e.g., keywords). For example, an image containing apples and bananas may contain a set of visual words that corresponds to an apple and another set of visual words that correspond to a banana. This same image may also be associated with linguistic words "apple", "banana", and "fruit".

A "visual word" is any representation of a characteristic or feature of an image, and is not limited to the "codeword" used in the process described above. Similarly, a "linguistic word" is any text that is associated with an image, and may be, though is not limited to, a keyword that is used to describe the image.

Regional Annotation

One feature of representing images as collections of visual words is a finer resolution for image description. Specifically, an image may be divided into regions, and each image region may have its own set of visual words. Thus, each visual word may annotate only a small region of an image. Consequently, the association of keywords with visual words, instead of with entire images, results in more accurate descriptions of images overall.

Bipartite Graph Model

Figure 1:
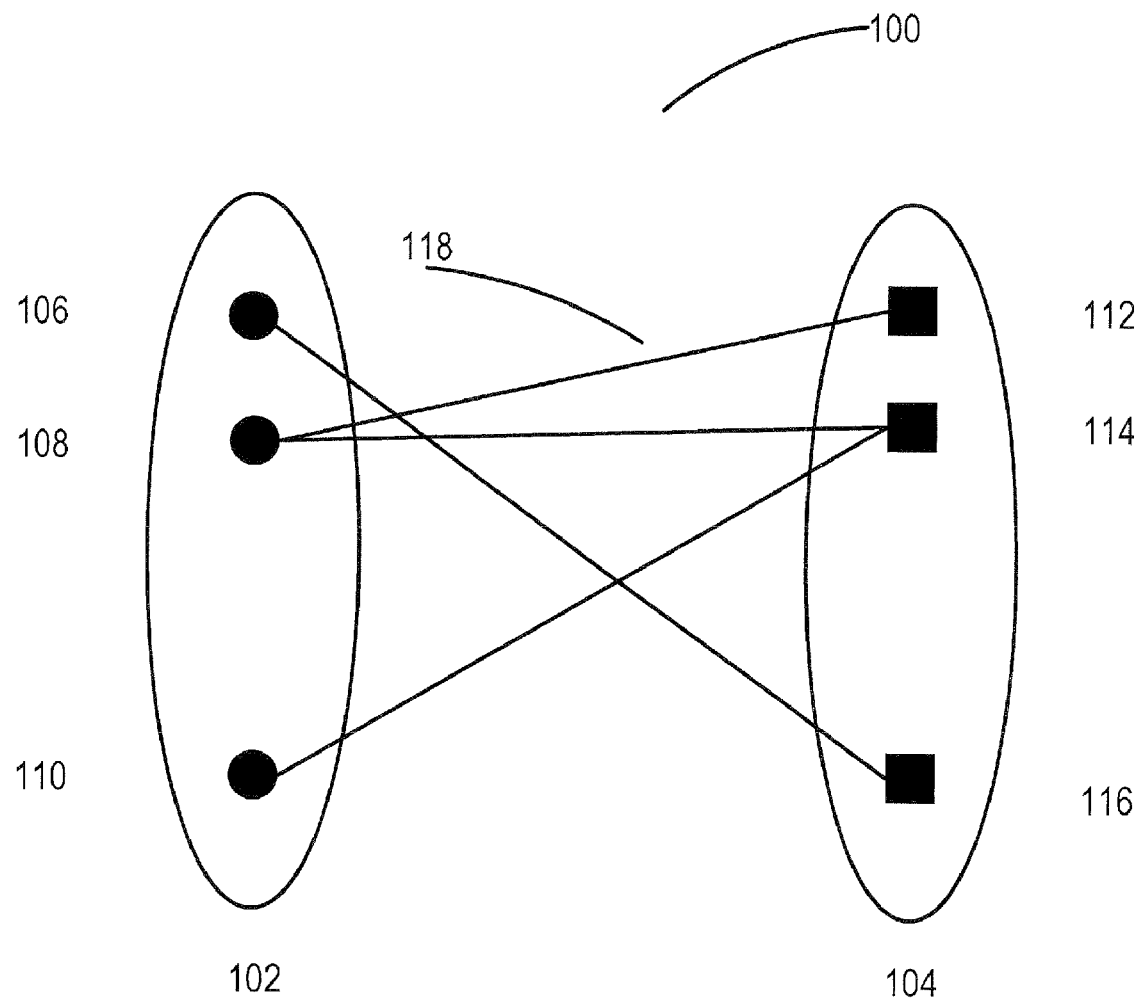
FIG. 1 is an example of a bipartite graph that contains a partition for linguistic words and a partition for visual words.

A bipartite graph model is constructed based on the linguistic words and visual words for the images. FIG. 1 illustrates an example of a bipartite graph 100, with two partitions 102 and 104. The bipartite graph model is constructed so that one partition contains nodes that represent linguistic words and the other partition contains nodes that represent visual words. In FIG. 1, partition 102 contains nodes 106, 108, and 110, each of which represents a linguistic word. Partition 104 contains nodes 112, 114, and 116, each of which represents a visual word.

Furthermore, the bipartite graph also contains connections between the nodes for linguistic words and the nodes for visual words. The bipartite graph is constructed so that there is a connection between a node for a particular linguistic word and a node for a particular visual word if the particular linguistic word is a keyword found to describe an image that is represented by the particular visual word. Connection 118 is an example of a connection between a node 108 for a linguistic word and a node 112 for a visual word in a bipartite graph. The existence of connection 118 means that in the database of images and associated keywords from which bipartite graph 100 is constructed, there is at least one image which is represented by visual word 112 and which is associated with keyword 108. The bipartite graph contains no connections between nodes of the same partition.

Figure 2:
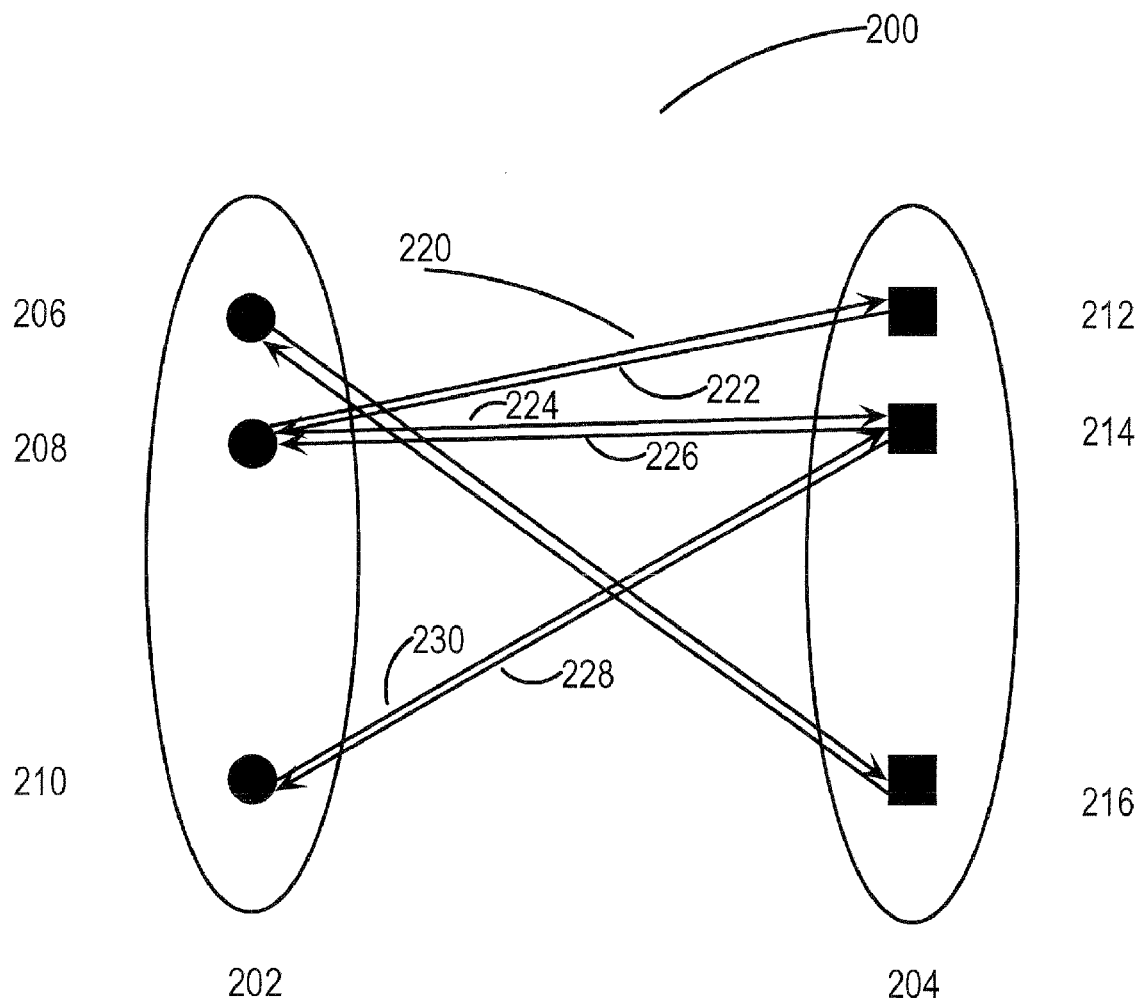
FIG. 2 is another example of a bipartite graph that contains a partition for linguistic words and a partition for visual words, where connections between nodes representing linguistic words and nodes representing visual words are shown as sets of two directed edges.

Each connection in the bipartite graph is labeled with probabilities that correspond to how the linguistic words and visual words are associated. FIG. 2 illustrates a bipartite graph 200, with two partitions 202 and 204. Partition 202 contains nodes 206, 208, and 210, each of which represents a linguistic word. Partition 204 contains nodes 212, 214, and 216, each of which represents a visual word. Each connection in bipartite graph 200 is represented by a pair directed edges. In each pair of directed edges, one edge is directed from a node for a linguistic word to a node for a visual word, and another edge is directed from a node for a visual word to a linguistic word. For example, the connection between node 208 and node 212 is represented by directed edge 220, which is directed from node 208 to node 212, and directed edge 222, which is directed from node 212 to node 208. A directed edge from a node for a linguistic word to a node for a visual word is labeled with a probability that is proportional to the number of times the visual word occurs in an image that is described by the linguistic word. A directed edge from a node for a visual word to a node for a linguistic word is labeled with a probability that is proportional to the number of times the linguistic word is found to describe an image that contains the visual word. The probabilities may be normalized so that the sum of probabilities for directed edges at any node which direct away from the node is 1.

Figure 3:
FIG. 3 is a table containing example visual word and linguistic word associations for the bipartite graph in FIG. 2

To illustrate how the edges in bipartite graph 200 indicates probabilities of association, table 300 in FIG. 3 lists four images—A, B, C, and D—that are associated with the visual words and linguistic words in FIG. 2. The associations are listed in table 300 and are also consistent with the connections in FIG. 2. Table 300 indicates that the linguistic word represented by node 208 is associated with two images, A and B. Image A is in turn associated with the visual word represented by visual word 212, and image B is associated with the visual word represented by visual word 214. Therefore, in half of the images associated with the linguistic word represented by node 208, the visual word represented by node 212 occurs. As a result, edge 220 is labeled with 50% probability. Similarly, edge 224 is labeled with 50% probability. To contrast, the visual word represented by node 214 is associated with image C, which is the only image that is associated with the linguistic word represented by node 210. As a result, edge 230 is labeled with 100% probability. However, the visual word represented by node 214 is also associated with image B, which is associated with linguistic word 208. Therefore, edge 228 is labeled with 50% probability.

Calculating Statistics Using the Bipartite Graph Model

Once a bipartite graph model is constructed for a database of images, statistical calculations may be performed on the bipartite graph to determine the probability that a particular visual word occurs in an image that is associated with a particular linguistic word. Conversely, the probability that a particular linguistic word is associated with an image that contains a particular visual word may also be calculated.

According to one approach, a random walk is performed on the bipartite graph. The "walker" starts walking on a node in either partition. The "walker" walks from a current node to the next node by walking on a directed edge that is directed away from the current node to the next node. When there are two or more such edges connected to the current node, the "walker" picks one of these edges for the next step based on the probabilities labeled on the edges. The probability that the "walker" will pick a particular edge is equal to the probability labeled on the edge. This is also called the transition probability.

For example, a walker starts on node 208 in FIG. 2. There are two directed edges leading away from node 208, edge 220 and edge 224. Edge 220 leads to node 212, while edge 224 leads to node 214. Based on the probabilities labeled on edges 220 and 224, the walker chooses one of the edges. If the walker chooses edge 224, the walker will walk to node 214 in the next step. At node 214, there are also two edges directed away from node 214: edge 226 and edge 228. The walker next chooses one of edge 226 and edge 228, based on the probabilities labeled on these edges. If the walker chooses edge 228, the walker to walk to node 202 in the next step. At node 202, there is only one edge that directs away from node 202: edge 230. This means that the probability labeled on edge 230 is 1. Therefore, in the next step, the walker will choose edge 230 to reach node 214.

The performance of random walks on a bipartite graph is used to calculate probability distributions of linguistic words and visual words. Two probability distributions are calculated: stationary probability distributions and probability distributions with restarts. Techniques for calculating these probability distributions are described in detail hereafter.

Stationary Probability Distributions

The stationary probability distribution for the nodes in the bipartite graph is represented by the vector $\pi_0$. The vector $\pi_0$ contains as many values as there are nodes in the bipartite graph, and each value in $\pi_0$ represents the probability that the "walker" in the random walk described above is occupying the particular node that correspond to the value, at a time at which the node occupancy probabilities have reached a steady state. The vector $\pi_0$ has two components: $\pi_0^L$ (stationary distribution over linguistic words) and $\pi_0^V$ (stationary distribution over visual words). That is, if the two partitions of the bipartite graph are denoted L (for linguistic words) and V (for visual words), where the L partition has M nodes and the V partition has N nodes, then $\pi_0$ is equal to $[\pi_0^L \ \pi_0^V]$ where $\pi_0^L$ is an M×1 probability vector corresponding to the nodes in the L partition, and $\pi_0^V$ is an N×1 probability vector corresponding to the nodes in the V partition. Thus, $\pi_0$ has a total of M+N values, each value corresponding to one of the nodes in the two partitions of the bipartite graph.

In other words, the stationary probability vector $\pi_0$ is the vector that does not change under application of $P_A$, where $P_A$ is the connection diagram or transition matrix of the bipartite graph. Thus, $\pi_0$ is given by:

$$\pi_0 = P_A \pi_0$$

$P_A$ contains values which represent the probability of transitioning from one particular node in the bipartite graph to another node in the bipartite graph. As discussed above, these probabilities are the labels on the directed edges in the connections between nodes in the bipartite graph. Therefore, if there is no connection between a particular node and another node, then the values in $P_A$ that correspond to these two nodes is 0.

Probability Distributions with Restarts

The stationary probability distribution for nodes in the bipartite graph with restarts at the w node is represented by the vector $\pi_w$. To calculate $\pi_w$, a random walk is performed as described above, except that the "walker" restarts at the w node every once in a while. The probability that the "walker" restarts the walk at the w node is $\lambda$, which may be set to any probabilistic value. The vector $\pi_w$ is given by:

$$\pi_w = (1-\lambda) P_A \pi_w + \lambda q_w$$

The vector $\pi_w$ is equal to $[\pi_w^L \ \pi_w^V]$, where $\pi_w^L$ is an M×1 probability vector corresponding to the nodes in the L partition, and $\pi_w^V$ is an N×1 probability vector corresponding to the nodes in the V partition. The vector $q_w$ is a vector with 1 at the node corresponding to w and 0 at other positions. A more detailed discussion of this method of calculating the stationary probability of a particular node with restarts can be found in J. Sun, et al., "Neighborhood Formation and Anomaly Detection in Bipartite Graphs", ICDM, 2005.

Using Probability Distributions to Determine Strength of Associations Between Linguistic and Visual Words According to one approach, calculations based on $\pi_0$ and $\pi_w$ may be performed to determine the strength of association between a linguistic word and a visual word, between a linguistic word and a linguistic word, and between a visual word and visual word.

If the w node represents a linguistic word, then the association strength, or association score, of visual words associated with linguistic word w is given by: $\pi_w^V - \pi_0^V$. To obtain only the visual words which are associated with the linguistic word w with a threshold amount of strength, the association score may be compared to a preset threshold value.

If the w node represents a linguistic word, then the association strength, or association score, of linguistic words associated with linguistic word w is given by: $\pi_w^L - \pi_0^L$. To obtain only the linguistic words which are associated with the linguistic word w with a threshold amount of strength, the association score may be compared to a preset threshold value.

If the w node represents a visual word, then the association strength, or association score, of linguistics words associated with visual word w is given by: $\pi_w^L - \pi_0^L$. To obtain only the linguistics words which are associated with the visual word w with a threshold amount of strength, the association score may be compared to a preset threshold value.

If the w node represents a visual word, then the association strength, or association score, of visual words associated with visual word w is given by: $\pi_w^V - \pi_0^V$. To obtain only the visual words which are associated with the visual word w with a threshold amount of strength, the association score may be compared to a preset threshold value.

In other approaches, more complex probabilistic calculations may be performed to determine probability distributions of linguistic words and visual words. For example, calculations may be performed to evaluate whether a group of visual words is highly associated with a linguistic word, and vice versa.

Applications of the Bipartite Graph Model

Keyword Association. According to one approach, associations between disjoint keywords may be derived from the keywords' associations with visual words. For example, two keywords may be associated with each other based on how many visual words they have in common. A threshold value may also be set so that only visual words which are associated with the keywords with an association score greater than the threshold value are compared. Another threshold value may be set so that two keywords are determined to be implicitly associated with each other if they have a number of visual words in common, where the number if greater than the threshold value. In sum, keywords, which are linguistic words, become implicitly associated with each other through visual content.

Query Expansion. According to one approach, implicit associations between keywords that are made based on common visual content associated with the keywords are used to expand the search space of queries. Query expansion through textual synonyms is a common technique employed by search engines to capture as many relevant results as possible. For example, if a user queries a database or a web search engine for "car", the query may be expanded to include dictionary synonyms of car, such as "automobile" and "vehicle." According to this approach, a query for a linguistic word may be expanded to include other linguistic words which are implicitly associated with the query through visual content.

By deriving implicit associations between keywords through visual content, queries can now be expanded to include further relevant results beyond those generated from a purely text-based query expansion method. For example, the linguistic words "car" and "wheels" may be implicitly associated with each other because they are both associated with the same kinds of images. Therefore, a query of "car" may be expanded to include "wheels" even though "wheels" is not a dictionary synonym of "cars". In addition, two images which are similar might be described by different keywords because people think differently when trying to describe an image using text. In this approach, the different keywords become implicitly associated through their common visual content. According to another approach, equivalent keywords in different languages can be associated through a database of images that are tagged with keywords in multiple languages.

Automatic Annotation. According to one approach, associations between keywords and visual words, as captured by a bipartite graph model, may be the basis for automatically annotating a new image which is not part of the bipartite graph. For example, a new image I contains a set of visual words $V_I$. For a particular keyword w in the bipartite graph, a set of visual words $V_w$ is associated with the keyword w. The intersection of $V_I$ and $V_w$ thus measures how well w describes the image I. The bigger the intersection, the more visual words $V_I$ and $V_w$ have in common, and thus the more accurate a description for I using w. A threshold may be set so that all keywords which contain a set of visual words which have at least a threshold number of common visual words with $V_I$ are denoted keywords of image I.

Spurious Tag Detection. Often, tags used to describe an image are not about objects in the image but about the image itself. For example, tags like "Tokyo" do not describe anything in the image, but are about the image. According to one approach, spurious tag detection may be performed to remove such inaccurate tags. For example, tags which have low association strengths with the visual words in a particular images may be disassociated with the image.

Improving Search Relevance. The techniques just described may be employed to improve the search relevance for images. First, a query for images based on an initial query term may be expanded to include query terms that are implicitly associated with the initial query term, thereby generating more relevant image results. Second, images which have not be annotated with keywords may be automatically annotated, thereby increasing the number of images which may be searched. Third, region annotation increases the accuracy and granularity of image descriptions. Finally, spurious tags from annotated images may be removed, also increasing the accuracy of image description and thereby improving search relevance.

Hardware Overview

Figure 4:
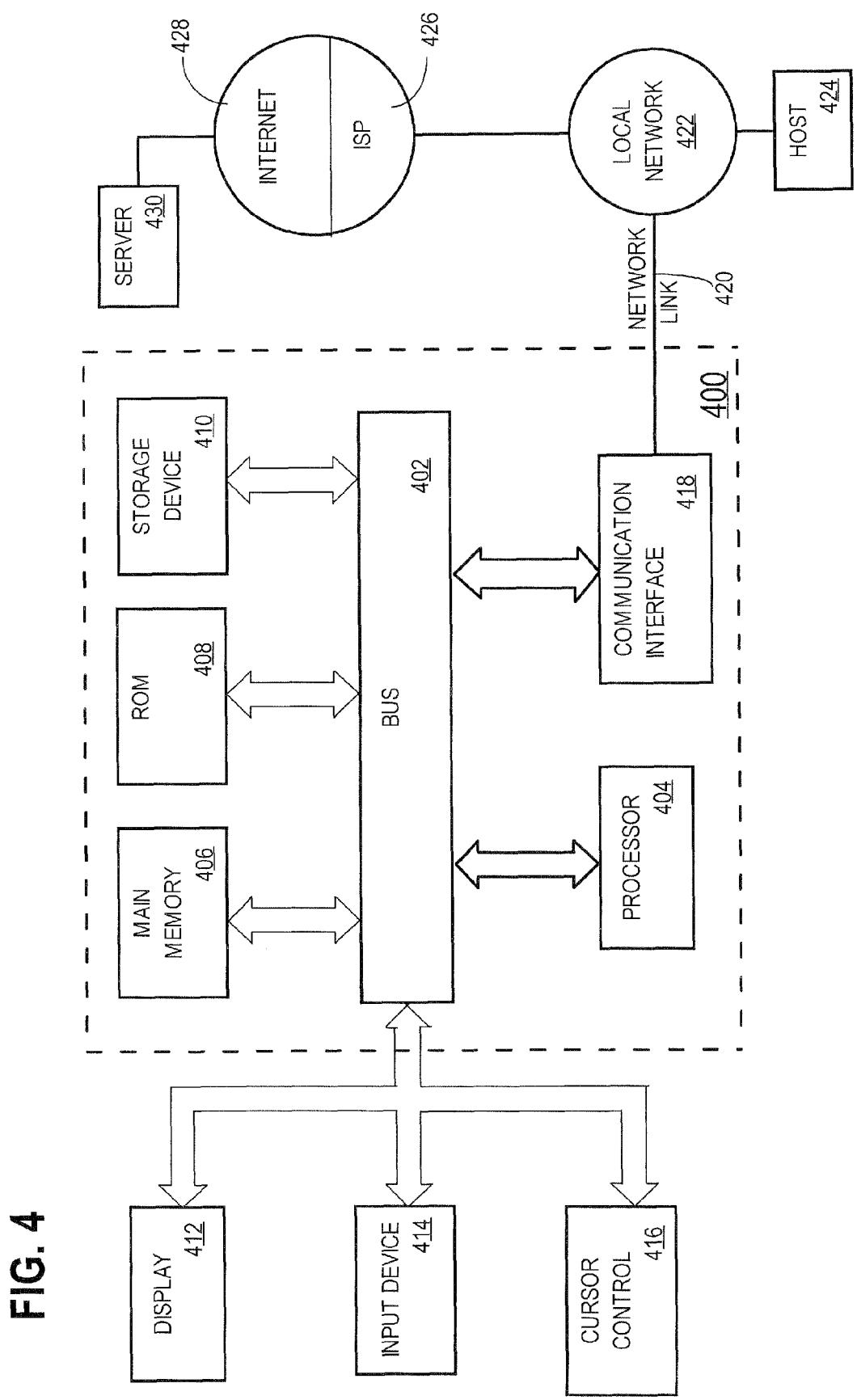
FIG. 4 is a block diagram of a computer system upon which embodiments of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to storage media and transmission media. Storage media includes both non-volatile media and volatile media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   constructing, based on a set of data, a bipartite graph;
   wherein the set of data comprises a set of visual words, a set of linguistic words, and a set of associations between the set of visual words and the set of linguistic words;
   wherein each association in the set of associations is an association between a visual word in the set of visual words and a linguistic word in the set of linguistic words;
   wherein constructing the bipartite graph includes constructing a first partition and a second partition;
   wherein the first partition comprises a first set of nodes;
   wherein each node in the first set of nodes represents a linguistic word in the set of linguistic words;
   wherein the second partition comprises a second set of nodes;
   wherein each node in the second set of nodes represents a visual word in the set of visual words;
   deriving and storing in volatile or non-volatile memory, based on the bipartite graph, an association score between a first node of said bipartite graph and a second node of said bipartite graph;
   wherein the association score is derived, at least in part, on a random walk through the bipartite graph, wherein the random walk is performed based, at least in part, on probabilities labeled on directed edges in connections between nodes in the first set of nodes and nodes in the second set of nodes; and
   wherein the probability associated with a directed edge from one node to another node is based, at least in part, on the probability that one word represented by the one node is associated with any image in a set of images with which another word represented by the other node is associated;
   wherein the method is performed by one or more computing devices.

2. The method of claim 1 wherein the step of deriving the association score includes:
   generating a first set of scores based on the random walk through the bipartite graph;
   generating a second set of scores based on the random walk, with restart from the first node, through the bipartite graph; and
   deriving the association score based on the first set of scores and the second set of scores.

3. The method of claim 1, further comprising:
   constructing a set of connections between the first set of nodes and the second set of nodes;
   wherein each connection in the set of connections connects a node in the first set of nodes and a node in the second set of nodes if there is an association between the linguistic word represented by the node in the first set of nodes and the visual word represented by the node in the second set of nodes;
   wherein each connection in the set of connections comprises a first directed edge and a second directed edge;
   wherein the first directed edge is directed from the node in the first set of nodes to the node in the second set of nodes;
   wherein the second directed edge is directed from the node in the second set of nodes to the node in the first set of nodes;

wherein the first directed edge is labeled with a first probability;

wherein the first probability indicates a probability that the visual word represented by the node in the second set of nodes occurs in any image in the set of images described by the linguistic word represented by the node in the first set of nodes;

wherein the second directed edge is labeled with a second probability;

wherein the second probability indicates a probability that the linguistic word represented by the node in the first set of nodes describes any image in the set of images in which the visual word represented by the node in the second set of nodes occurs;

wherein the random walk, with one or more restarts from the first node, through the bipartite graph is performed based on probabilities labeled on directed edges in connections between nodes in the first set of nodes and nodes in the second set of nodes, wherein the one or more restarts at the first node are based on a restart probability.

4. The method of claim 3, wherein:
the set of data further comprises a set of images; and
wherein a particular association score between a particular visual word in the set of visual words and a particular linguistic word in the set of linguistic words accounts for whether or not the particular visual word occurs in an image described by the particular linguistic word.

5. The method of claim 1 wherein the first node represents a linguistic word, the second node represents a visual word, and the association score indicates a degree of association between the linguistic word and the visual word.

6. The method of claim 5 wherein the association score indicates how strongly the linguistic word is associated with any image in a set of images in which the visual word occurs.

7. The method of claim 5 wherein the association score indicates how strongly the visual word is associated with any image in a set of images described by the linguistic word.

8. The method of claim 1 wherein the first node represents a first linguistic word, the second node represents a second linguistic word, and the association score indicates a degree of association between the first linguistic word and the second linguistic word.

9. The method of claim 1 wherein the first node represents a first visual word, the second node represents a second visual word, and the association score indicates a degree of association between the first visual word and the second visual word.

10. The method of claim 6, further comprising:
receiving a new image;
generating a new set of visual words;
wherein each visual word in the new set of visual words represents a characteristic of the new image;
for each visual word in the set of new visual words and each linguistic word associated with the each visual word, performing the step of deriving an association score;
wherein the first node represents the each visual word;
wherein the second node represents the each linguistic word that is associated with the each visual word;
wherein the step of deriving an association score further comprises storing the association score in a set of association scores;
determining, based on the set of association scores, a new set of linguistic words;
wherein the new set of linguistic words is used to describe the new image.

11. The method of claim 10, wherein each linguistic word in the new set of linguistic words is represented by a node which has an association score with the each visual word that is above a preset threshold.

12. The method of claim 6, further comprising:
receiving a new image;
generating a new set of visual words;
wherein each visual word in the new set of visual words represents a characteristic of the new image;
receiving a first set of linguistic words;
wherein the first set of linguistic words is associated with the new image;
for each visual word in the set of new visual words and each linguistic word in the first set of linguistic words, performing the step of deriving an association score;
wherein the first node represents the each visual word;
wherein the second node represents the each linguistic word;
wherein the step of deriving an association score further comprises storing the association score in a set of association scores;
based at least in part on the set of association scores, eliminating linguistic words from the first set of linguistic words.

13. The method of claim 12, wherein eliminating linguisting words from the first set of linguistic words comprises eliminating all linguistic words represented by nodes whose association scores with visual words in the new set of visual words is below a preset-threshold.

14. A non-transitory computer-readable storage medium storing instructions, the instructions including instructions which, when executed by one or more processors, cause the one or more processors to perform the steps of:
constructing, based on a set of data, a bipartite graph;
wherein the set of data comprises a set of visual words, a set of linguistic words, and a set of associations between the set of visual words and the set of linguistic words;
wherein each association in the set of associations is an association between a visual word in the set of visual words and a linguistic word in the set of linguistic words;
wherein constructing the bipartite graph includes constructing a first partition and a second partition;
wherein the first partition comprises a first set of nodes;
wherein each node in the first set of nodes represents a linguistic word in the set of linguistic words;
wherein the second partition comprises a second set of nodes;
wherein each node in the second set of nodes represents a visual word in the set of visual words;
deriving and storing in volatile or non-volatile memory, based on the bipartite graph, an association score between a first node of said bipartite graph and a second node of said bipartite graph;
wherein the association score is derived, at least in part, on a random walk through the bipartite graph, wherein the random walk is performed based, at least in part, on probabilities labeled on directed edges in connections between nodes in the first set of nodes and nodes in the second set of nodes; and
wherein the probability associated with a directed edge from one node to another node is based, at least in part, on the probability that one word represented by the one node is associated with any image in a set of images with which another word represented by the other node is associated.

15. The non-transitory computer-readable storage medium of claim 14 wherein the instructions for deriving the association score includes instructions for:
  generating a first set of scores based on the random walk through the bipartite graph;
  generating a second set of scores based on the random walk, with restart from the first node, through the bipartite graph; and
  deriving the association score based on the first set of scores and the second set of scores.

16. The non-transitory computer-readable storage medium of claim 14, further comprising instructions for:
  constructing a set of connections between the first set of nodes and the second set of nodes;
  wherein each connection in the set of connections connects a node in the first set of nodes and a node in the second set of nodes if there is an association between the linguistic word represented by the node in the first set of nodes and the visual word represented by the node in the second set of nodes;
  wherein each connection in the set of connections comprises a first directed edge and a second directed edge;
  wherein the first directed edge is directed from the node in the first set of nodes to the node in the second set of nodes;
  wherein the second directed edge is directed from the node in the second set of nodes to the node in the first set of nodes;
  wherein the first directed edge is labeled with a first probability;
  wherein the first probability indicates a probability that the visual word represented by the node in the second set of nodes occurs in any image in the set of images described by the linguistic word represented by the node in the first set of nodes;
  wherein the second directed edge is labeled with a second probability;
  wherein the second probability indicates a probability that the linguistic word represented by the node in the first set of nodes describes any image in the set of images in which the visual word represented by the node in the second set of nodes occurs;
  wherein the random walk, with one or more restarts from the first node, through the bipartite graph is performed based on probabilities labeled on directed edges in connections between nodes in the first set of nodes and nodes in the second set of nodes, wherein the one or more restarts at the first node are based on a restart probability.

17. The non-transitory computer-readable storage medium of claim 14 wherein the first node represents a linguistic word, the second node represents a visual word, and the association score indicates a degree of association between the linguistic word and the visual word.

18. The non-transitory computer-readable storage medium of claim 15 wherein the association score indicates how strongly the linguistic word is associated with any image in a set of images in which the visual word occurs.

19. The non-transitory computer-readable storage medium of claim 15 wherein the association score indicates how strongly the visual word is associated with any image in a set of images described by the linguistic word.

20. The non-transitory computer-readable storage medium of claim 14 wherein the first node represents a first linguistic word, the second node represents a second linguistic word, and the association score indicates a degree of association between the first linguistic word and the second linguistic word.

21. The non-transitory computer-readable storage medium of claim 14 wherein the first node represents a first visual word, the second node represents a second visual word, and the association score indicates a degree of association between the first visual word and the second visual word.

22. The non-transitory computer-readable storage medium of claim 14, wherein:
  the set of data further comprises a set of images; and
  wherein a particular association score between a particular visual word in the set of visual words and a particular linguistic word in the set of linguistic words accounts for whether or not the particular visual word occurs in an image described by the particular linguistic word.

23. The non-transitory computer-readable storage medium of claim 18, further comprising instructions for:
  receiving a new image;
  generating a new set of visual words;
  wherein each visual word in the new set of visual words represents a characteristic of the new image;
  for each visual word in the set of new visual words and each linguistic word associated with the each visual word, performing the step of deriving an association score;
  wherein the first node represents the each visual word;
  wherein the second node represents the each linguistic word that is associated with the each visual word;
  wherein the step of deriving an association score further comprises storing the association score in a set of association scores;
  determining, based on the set of association scores, a new set of linguistic words;
  wherein the new set of linguistic words is used to describe the new image.

24. The non-transitory computer-readable storage medium of claim 18, further comprising instructions for:
  receiving a new image;
  generating a new set of visual words;
  wherein each visual word in the new set of visual words represents a characteristic of the new image;
  receiving a first set of linguistic words;
  wherein the first set of linguistic words is associated with the new image;
  for each visual word in the set of new visual words and each linguistic word in the first set of linguistic words, performing the step of deriving an association score;
  wherein the first node represents the each visual word;
  wherein the second node represents the each linguistic word;
  wherein the step of deriving an association score further comprises storing the association score in a set of association scores;
  based at least in part on the set of association scores, eliminating linguistic words from the first set of linguistic words.

25. The non-transitory computer-readable storage medium of claim 23, wherein each linguistic word in the new set of linguistic words is represented by a node which has an association score with the each visual word that is above a preset threshold.

26. The non-transitory computer-readable storage medium of claim 24, wherein the instructions for eliminating linguisting words from the first set of linguistic words comprise instructions for eliminating all linguistic words represented by nodes whose association scores with visual words in the new set of visual words is below a preset-threshold.

* * * * *